US012766885B2

(12) United States Patent
Smith et al.

(10) Patent No.: US 12,766,885 B2
(45) Date of Patent: Oct. 20, 2026

(54) SUPPORT STRUCTURE FOR AXLE HOUSING

(71) Applicant: Magna Powertrain of America, Inc., Troy, MI (US)

(72) Inventors: Wade Smith, Mussey, MI (US); Ryan Strand, Rochester Hills, MI (US); Ryan Shaw, Clarkston, MI (US)

(73) Assignee: Magna Powertrain of America, Inc.

( * ) Notice: Subject to any disclaimer, the term of this patent is extended or adjusted under 35 U.S.C. 154(b) by 258 days.

(21) Appl. No.: 18/720,142

(22) PCT Filed: Dec. 13, 2022

(86) PCT No.: PCT/US2022/052612

§ 371 (c)(1),
(2) Date: Jun. 14, 2024

(87) PCT Pub. No.: WO2023/121906

PCT Pub. Date: Jun. 29, 2023

(65) Prior Publication Data

US 2025/0058586 A1 Feb. 20, 2025

Related U.S. Application Data

(60) Provisional application No. 63/292,741, filed on Dec. 22, 2021.

(51) Int. Cl.
*B60B 35/16* (2006.01)
*B60B 35/00* (2006.01)

(52) U.S. Cl.
CPC .......... *B60B 35/166* (2013.01); *B60B 35/007* (2013.01); *B60B 2900/111* (2013.01); *B60B 2900/311* (2013.01)

(58) Field of Classification Search
CPC ..... B60B 35/16; B60B 35/163; B60B 35/166; B60B 35/12; B60B 35/007; Y10T 74/2188; F16H 57/021
See application file for complete search history.

(56) References Cited

U.S. PATENT DOCUMENTS 2,478,180 A * 8/1949 Buckendale .......... B60B 35/166 74/607
3,905,089 A * 9/1975 Osenbaugh ........... F16H 57/023 29/434

(Continued)

FOREIGN PATENT DOCUMENTS

| | | | |
|---|---|---|---|
| CN | 108081870 A | | 5/2018 |
| JP | S62122703 U | * | 8/1987 |

OTHER PUBLICATIONS

European Patent Office, Rijswijk, Netherlands, International Search Report of International Application No. PCT/EP2022/052612, Mailed Feb. 23, 2023, 3 pages.

*Primary Examiner* — Kip T Kotter
(74) *Attorney, Agent, or Firm* — Dickinson Wright PLLC

(57) ABSTRACT

An axle assembly includes a carrier housing defining a receiving bore that receives a hollow axle tube. An axle shaft extends through the axle tube to an outboard end and is fixed to a wheel hub that extends around the axle tube and is rotatable relative thereto. The axle tube is attached within the receiving bore via an interference fit. The receiving bore is defined by an inner ring of a dual ring structure. A plurality of ribs extend radially between the inner ring and the outer ring of the dual ring structure. The dual ring structure has a reduced stress concentration relative to a single ring structure caused by bending loads resulting from upward reaction forces at the wheel end in response to downward chassis (Continued)

loads on the axle tube. The carrier housing and axle tube are different materials and fixed together without the use of welding.

18 Claims, 5 Drawing Sheets

(56) References Cited

U.S. PATENT DOCUMENTS

| | | | | |
|---|---|---|---|---|
| 5,655,418 | A | 8/1997 | Barnholt | |
| 5,713,247 | A * | 2/1998 | Skelton | B60K 17/16 74/606 R |
| 6,866,345 | B2 | 3/2005 | Fakhoury et al. | |
| 8,469,462 | B2 | 6/2013 | Doud et al. | |
| 10,935,124 | B2 | 3/2021 | Kruger et al. | |
| 2007/0023226 | A1 * | 2/2007 | Hawash | F16B 23/0038 411/405 |
| 2008/0295643 | A1 * | 12/2008 | Zalanca | B60B 35/006 74/607 |
| 2014/0274544 | A1 * | 9/2014 | Downs | F16C 33/581 475/246 |
| 2015/0290973 | A1 * | 10/2015 | Stamets | B21D 53/90 29/428 |
| 2016/0009136 | A1 * | 1/2016 | Chung | B60B 35/166 475/230 |

* cited by examiner

SUPPORT STRUCTURE FOR AXLE HOUSING

CROSS-REFERENCE TO RELATED APPLICATIONS

The present application is a U.S. National Stage Patent Application that claims the benefit of PCT International Patent Application No. PCT/US2022/052612, filed Dec. 13, 2022, which claims the benefit of U.S. Provisional Patent Application No. 63/292,741, filed Dec. 22, 2021, the entire disclosures of which are hereby incorporated by reference in their entirety.

FIELD OF THE INVENTION

The present invention relates generally to a support structure for an axle housing and axle tube.

BACKGROUND OF THE INVENTION

This section provides background information related to the present disclosure, which is not necessarily prior art.

Salisbury design axles have been utilized in the automotive industry for some time. With this type of axle housing, typically a steel axle tube is pressed into each one of a pair of cast iron carrier housing bores, with each tube being plug welded to the carrier through radially extending holes formed in the corresponding carrier housing. The carrier housings require strength to withstand stress from two primary sources. The first source of stress is tangential and radial stress resulting from the interference fit between the axle tube and the carrier housing, as the axle tube is pressed into the carrier housing. The second source of stress is the relatively large bending moments and associated bending stresses at the carrier housing-to-tube interface caused by suspension loads applied at the spring mounts and wheels.

More recently, cast aluminum or other non-ferrous alloys have been utilized to manufacture the axle carriers in place of cast iron in response to customer demands for weight reduction, and the associated increase in fuel efficiency of the vehicle. The use of cast aluminum carriers creates a challenge when attaching the steel tubes as the plug welding method of a cast iron housing can no longer be utilized. The outboard ends of the carrier housings have been known to comprise fracture origin cites during high load testing of aluminum axle carriers, due to the relatively high combined stress field existing at this location. The poor strength and fatigue life related to high stress and large deflections for lightweight materials could be optimized by higher strength materials, but this results in heavy or non-cost effective solutions. Other prior art has included surrounding the interface site between the axle tube and carrier housing with strengthening components mounted in the area which may improve functionality, but they come with complexity and added costs. Therefore, automotive design engineers continue to search for new and improved axle carrier housing designs having comparable strength, but reduced weight as compared to prior, cast iron material axle carriers.

SUMMARY

The present invention is aimed to provide an improved support structure having a carrier housing which is adapted to receive a cylindrical hollow tube, wherein the carrier portion surrounding the location of the inserted tube includes a revised housing arrangement to reduce stresses.

The axle housing may include a dual ring structure interconnected with multiple rib structures circumferentially arranged about the axle tube insertion bore to reduce stresses and limit deflection. The axle housing to axle tube interface may be an interference fit that is improved by the dual ring support structure.

It is an aspect of the present invention for the carrier housing utilizes a concentrically arranged dual ring structure interconnected with multiple rib structures circumferentially arranged about the axle tube insertion bore to limit deflection and therefore reduce stresses during high load events to an acceptable level while using a light weight material carrier and steel tube.

It is an aspect of the present disclosure to utilize a dual ring and integrated housing rib design to enable the bending loads and stress to be distributed across the housing, keeping localized stress levels low enough to allow for the use of lightweight castable materials.

It is an aspect of the present disclosure to utilize a dual ring and housing rib design to limit deflection between the insertion bore and the mounting flange of a carrier housing It is an aspect of the present disclosure to provide an improved interference interface between the tube and carrier housing which also eliminates the need to weld or adhere two dissimilar metals.

It is an aspect of the present invention to provide the enhancement to the strength of a carrier housing utilizing an optimized and lightweight support structure without additional components.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Example embodiments will now be described more fully with reference to the accompanying drawings. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Figure 1:
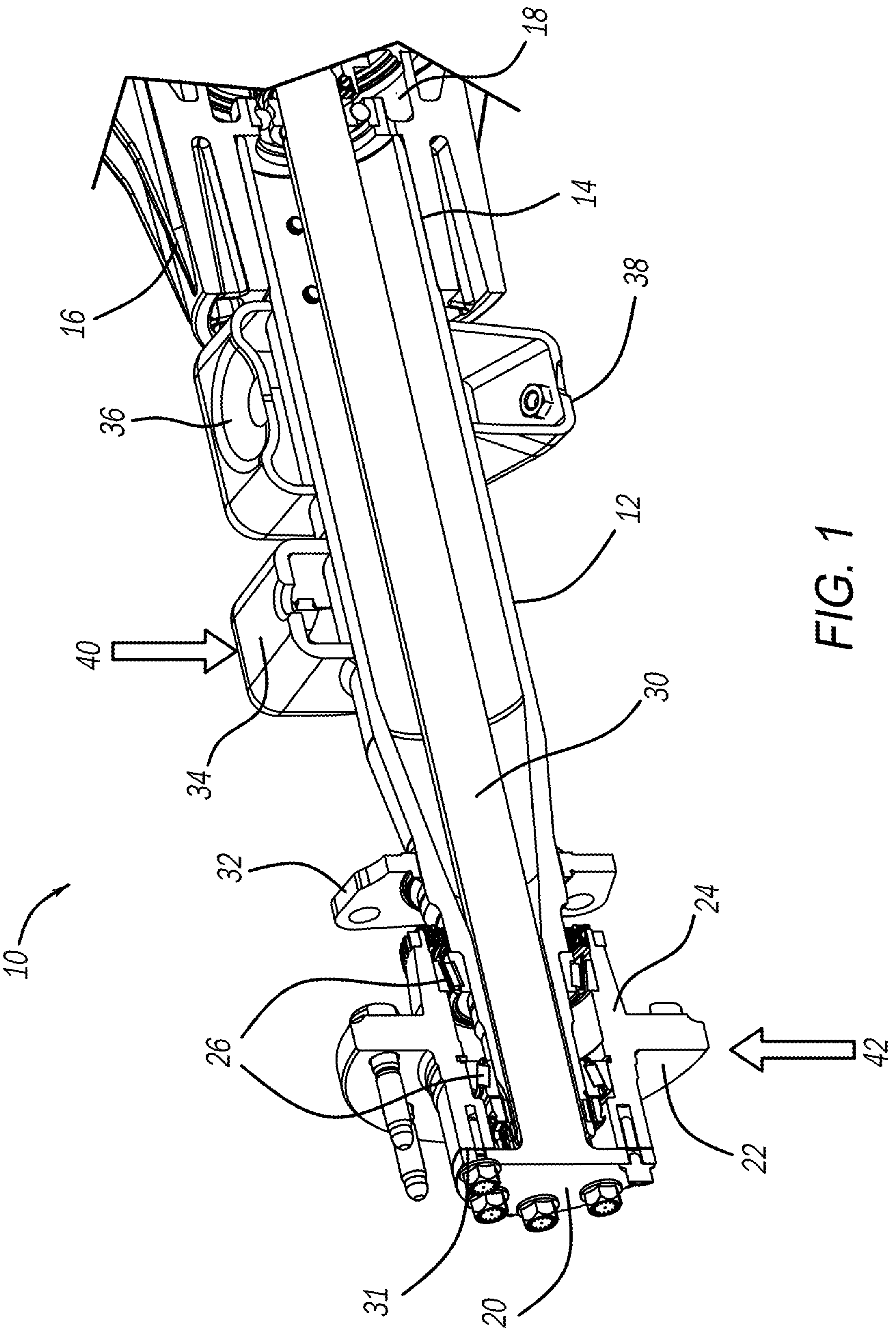
FIG. 1 is a cross sectional view of the axle tube and carrier end showing load points and associated components.

Referring to FIG. 1, a portion of an overall axle assembly 10 is shown to explain the overall arrangement of components and vehicle loads which the axle assembly 10 will see during operation. Approximately half of axle assembly 10 is shown, with an understanding components and arrangements shown here can be mirrored to the other half to provide for a complete axle assembly 10. Axle assembly 10 is a Salisbury type construction where a pair of axle tubes 12 are inserted (to the right in FIG. 1) in a receiving bore 14 of carrier housing 16 at an inboard end 18 of the assembly. Axle tubes 12 may be mild steel, while carrier housing 16 may be a castable aluminum, thereby reducing the mass of axle assembly 10. Although this disclosure should not limit the types of material, the use of these dissimilar metals requires new approaches to make such an arrangement successful, including stress reduction and developing a joining method between the carrier housing 16 and tube 12 that is different than traditional plug welding used for steel/cast iron designs.

Continuing to refer to FIG. 1, but now at the outboard end 20 of the assembly, the wheel of the vehicle is mounted to outboard facing flange 22 of wheel hub 24. In this "full floating" wheel end arrangement, wheel hub 24 is directly supported by tube 12 via bearings 26. Axle shaft 30 passes through tube 12 from inboard end 18 to outboard end 20. Axle shaft 30 transmits axle output power from a differential or geartrain internal to carrier housing 16 (not shown) to the wheel hub 22 (which is bolted at the outboard end to the axle shaft 30) and onto the attached vehicle wheel. Axle shaft 30 is connected to wheel hub 22 at location 31. The vehicle wheel (not shown) attaches to wheel hub 24. Immediately inboard of wheel hub 24 is a bracket 32 which is used to mount brake system components. Further inboard, mounted on the top of axle tube 12 is spring mount 34. Spring mount 34 supports the chassis frame of the vehicle via leaf or coil type springs (not shown). The load from the chassis, referred to as the chassis load 40, is applied to axle tube 12 through spring mount 34 and is transferred by the axle tube 12 to the vehicle's supporting wheels via wheel hub 24. Consider that a similar chassis load 40 will be applied on the other half of axle assembly 10 not shown. Further inboard from spring mount 34 on the upper surface of tube 12 a stop pad 36 is mounted. Stop pad 36 provides a surface for a bump stop device to limit suspension travel. At times during the vehicle's operation, the suspension may compress enough to cause contact between the chassis and stop pad 36 via a compliant/resilient bump stop. Approximately aligned along tube 12 with stop pad 36 but fixed to the bottom portion of axle tube 12 is shock mount 38, which receives a shock that is utilized to dampen spring oscillations and provide stability to axle assembly 10. Both of these additional interfaces may incur additional load and therefore stress from the chassis into tube 12, but the predominant loading that will affect carrier housing 16 surrounding the interface at receiving bore 14 is chassis loading 40 and resultant wheel loads 42 (shown counter to the chassis load 40 at the outboard end) as well as the interference fit between axle tube 12 and carrier housing 16.

During operation of the vehicle, and particularly when traveling on a rough road or when carrying heavy payloads, loading as previously described will result in axle assembly 10 being loaded downward vertically at two locations (on each side of the vehicle) through spring mounts 34. The wheel hub 24 at each outboard end of axle assembly 10 will apply a resultant wheel load 42 from each wheel. As these loads are applied at different locations along axle tube 12, axle assembly 10 causes a bending stress, as effectively load 42 in the upward direction will cause the outboard ends 20 to be displaced upwards while chassis load 40 will be applied in the downward direction. Shock from impacts to rough surfaces or potholes can apply a significant amount of bending stress into axle assembly 10. This will result in high stresses for the carrier housing 16 in the area surrounding where tube 12 is inserted.

Figure 2:
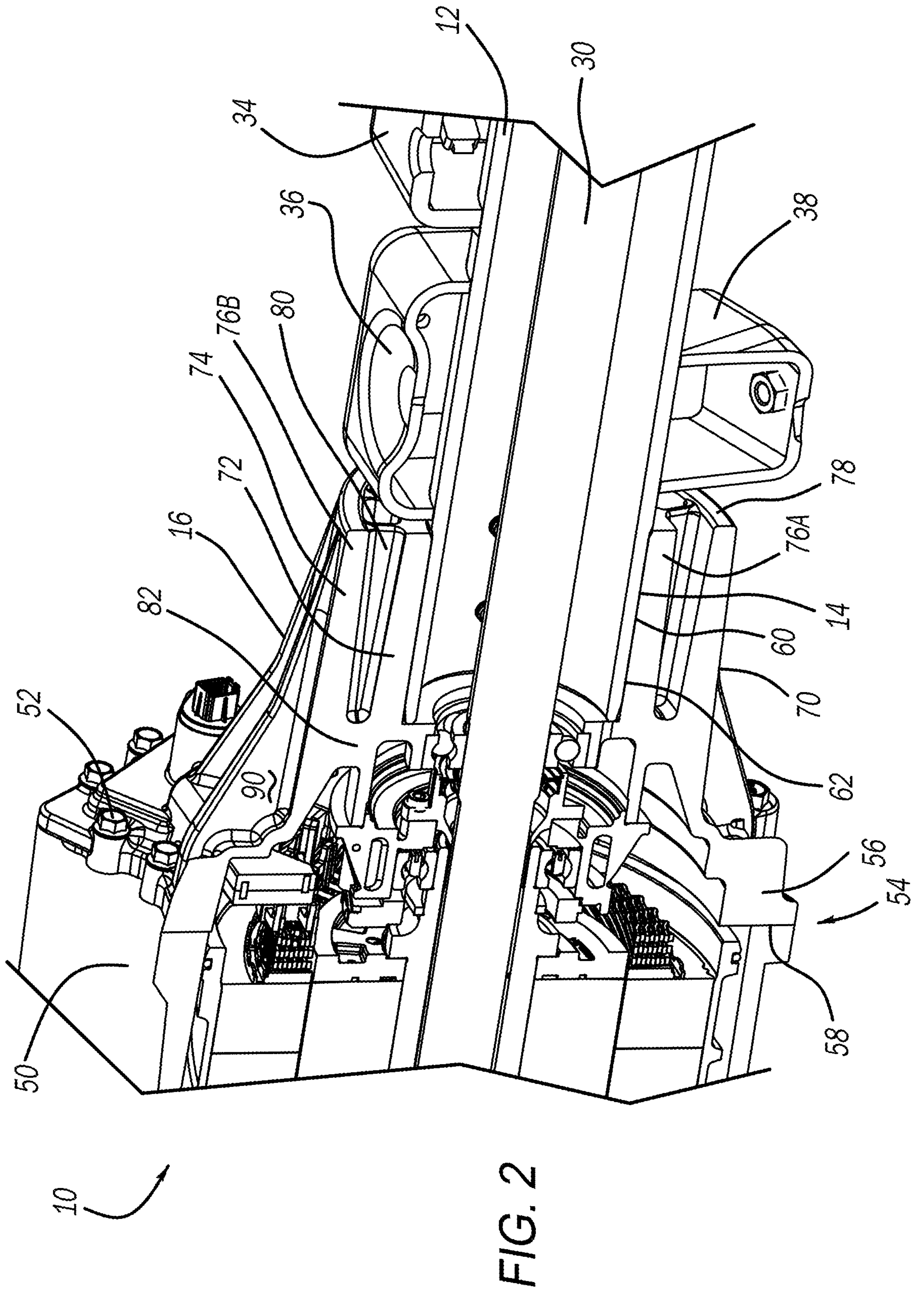
FIG. 2 is a cross sectional view of the carrier housing with dual ring structure including the axle tube installed.

Referring to FIG. 2, a more detailed view of the tube insertion area of carrier 16 is shown. The cross-section shown in FIG. 2 is on the opposite side of the vehicle, with the outboard end (not shown) on the right and the inboard end on the left. The tube 12 is inserted to the left in FIG. 2. For the purposes of this disclosure, overall axle assembly 10 comprises the following housing arrangement. A central housing 50 is located between a pair of carrier housings 16 (one shown in FIG. 2). Carrier housings 16 are fastened to central housing 50 with a plurality of fasteners 52 to form a rigid connection. Carrier housing 16 has a tapering shape with openings on each end. The first inboard end 54 has a larger opening and is defined by bolt flange 56 which mates to face 58 of central housing 50. Flange 56 has a circumferential arrangement of apertures 51 (FIG. 3) for receiving fasteners 52. This arrangement provides a stiff and strong connection between carrier housing 16 and central housing 50. At the opposite end of carrier housing 16 (right side in FIG. 2), which receives axle tube 12 in receiving bore 14, a dual ring reinforcement structure 70 is provided surrounding receiving bore 14. The joint between axle tube 12 and receiving bore 14 (in particular between axle tube 12 and the inner ring of the dual ring structure 70) is an interference or press fit arrangement.

As carrier housing material 16 is die cast aluminum and axle tube 12 is steel, according to one aspect of the disclosure, an interference connection not requiring welding of these dissimilar metals is preferred. Interference fits rely on constant stress and friction within the joint. As axle assembly 10 will be subjected to large ambient and operating temperature extremes as well as bending loading as previously described, it is desirable that the interface will not change during various operating conditions that could result in a loss of interference fit at the joint. As the thermal coefficients of expansion between aluminum and steel are quite different, a significant interface fit between the receiving bore 14 of carrier housing 16 and the outer diameter 60 of axle tube 12 is provided. This interference fit prevents and/or limits axle tube 12 from separating away from or rotating within bore 14. To achieve an acceptable interference fit such that the components are tightly connected under all operating conditions, the outer diameter 60 of axle tube 12 is larger in diameter than the receiving bore 14 of carrier housing 16. When these components are joined, stresses are introduced into carrier housing 14 as outer diameter 60 of axle tube 12 will exert a force on bore 14. These stresses are radial and tangential, with the highest concentration near the inner diameter 62 of receiving bore 14. If a ring structure, immediately radially outward surrounding bore 14, is not structurally strong enough to resist the forces from the interference fit, bore 14 could distort, increasing the diameter of receiving bore 14 due to the radially outward forces from axle tube 12. In traditional carrier housings 16 made of cast iron, the area around receiving bore 14 is a simple single ring structure due to the strength of the cast iron material and the ability to plug weld axle tube 12 to carrier housing 16. Analysis was conducted regarding whether such a single ring structure could be utilized with a die cast aluminum carrier housing 16, even with increased ring thickness to prevent distortion, and drawbacks were found when compared to the dual ring structure 70 proposed. Drawbacks to the single ring structure of die cast aluminum included increased weight of a single ring of increased thickness, and utilizing a single ring also increased the variability of interference fit along the length of receiving bore 14, resulting in stress concentrations and uneven force distribution within the ring structure from the interference fit forces alone. The benefits of a dual ring structure 70 of carrier housing 16 to overcome these drawbacks will be further described.

Continuing to refer to FIG. 2 Dual ring structure 70 of carrier housing 16 surrounds receiving bore 14. Dual ring structure 70 includes an inner ring 72 and an outer ring 74. Both of these rings are continuous in form, fully circumferentially surrounding receiving bore 14. Put another way, a cross-section taken perpendicular and transverse to the longitudinal axis at any point along the longitudinal length of the structure 70 will include a closed loop for each ring. Inner ring 72 and outer ring 74 have a variable cross section (parallel to the longitudinal direction as shown in FIG. 2) in the area of receiving bore 14, increasing in thickness 76 from outboard face 78 towards flange 56. Inner ring 72 may have an increased ring thickness 76*a* when compared to outer ring 76*b* when measured at outboard face 78. It was found that thickness 76*b* of the outer ring 74 could be reduced slightly without increasing stress in the dual ring structure 70. An array of ribs 80 are positioned equidistant from each other, in one aspect, to interconnect inner ring 72 to outer ring 74. Ribs 80 provide a structural connection between the inner and outer rings without requiring a fill of solid material, decreasing cost and mass. Inner ring 72 and outer ring 74 continue to taper, increasing in thickness 76, finally blending together just inboard of the position where receiving bore 14 ends, forming a combined ring structure 82. The combination of varying the cross-sectional thickness 76 in both rings along the length of receiving bore 14 and tying inner ring 72 and outer ring 74 together with ribs 80 results in a more even stress distribution from the forces generated by the interference fit and bending imparted by chassis loading 40. Utilizing such a dual ring structure 70 also reduced deflections of inner diameter 62 of receiving bore 14, particularly towards outboard face 78, from the interference press fit forces. Also, the levels of tangential and radial stress distribution are balanced in an improved manner by utilizing the combination of inner ring 72, outer ring 74 and joining ribs 80. This lack of deflection, resulting in a consistent and lower stress in the area of the press fit, combined with frictional effects within the joint ensures a proper connection between axle tube 12 and carrier housing 16. To further reduce bending stresses of carrier housing 16, an array of triangularly shaped ribs 90 structurally connect from the radially outer ring 74 to inboard flange 56. Ribs 90 are planarly and circumferentially aligned with ribs 80 to improve stiffness and deflections of receiving bore 14 relative to flange 56 due to chassis load 40 and resultant wheel loading 42. Utilizing the dual ring structure 70 and ribs 80 and 90 enables the bending loads and stresses to be distributed across the carrier housing 16, keeping localized stress levels low enough to allow for the use of lightweight castable materials for the carrier housing 16.

Figure 3:
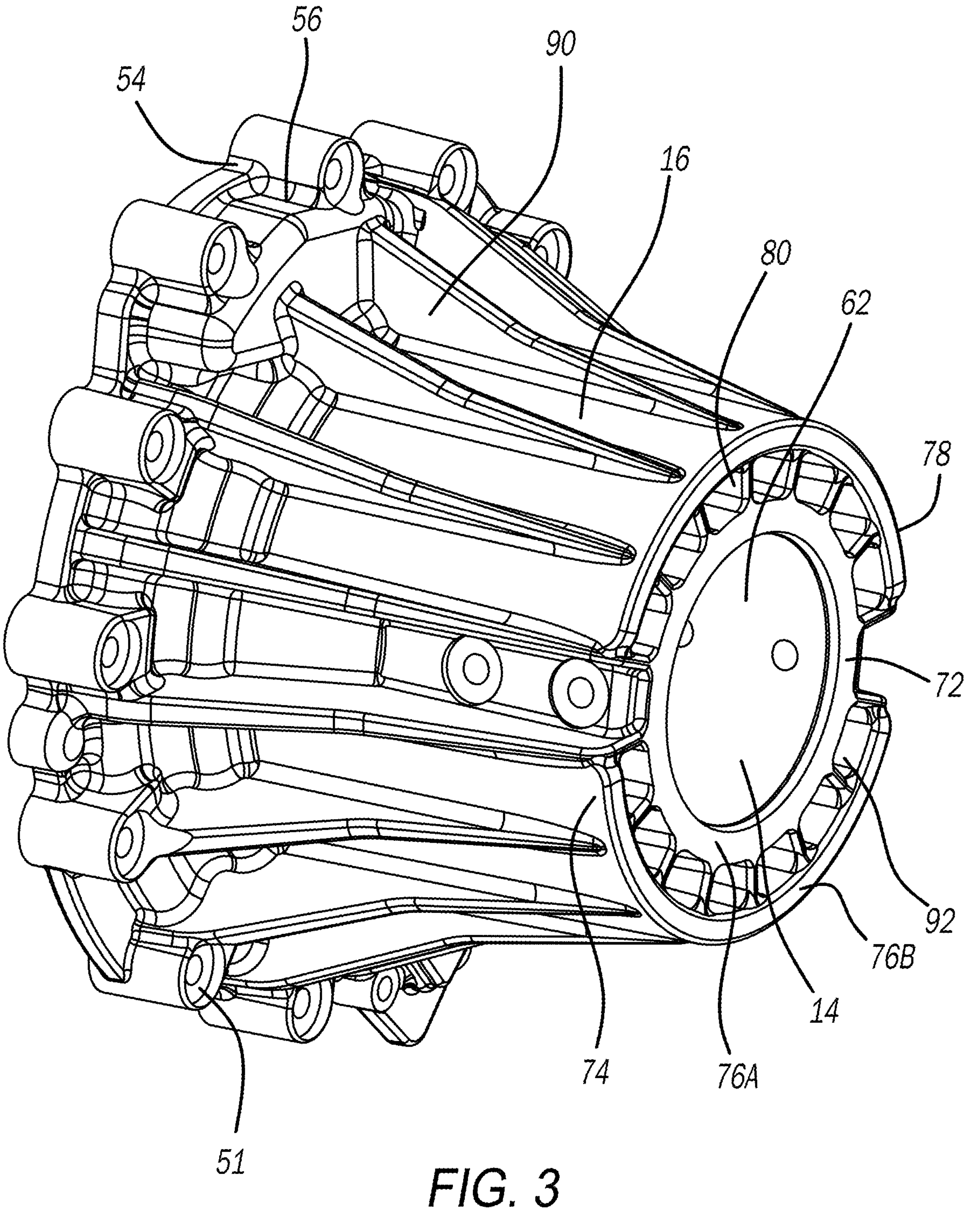
FIG. 3 is an isometric view of the carrier housing with dual ring structure.

Referring now to FIG. 3, dual ring structure 70 can be clearly seen comprising of an inner ring 72 and an outer ring 74 with multiple ribs 80 arranged circumferentially in between. In areas where rib 80 does not connect rings together, pocket 92 is formed which extends from outboard face 78 until where inner ring 72 and outer ring 74 converge to form combined ring 82 (as shown in FIG. 2). The planar and circumferential alignment between ribs 90 and ribs 80 can also be better seen in this view, where both ribs 80 and 90 are formed within the same planes radiating from the central longitudinal axis of the receiving bore 14. Apertures or thru holes 51 to receive fasteners 52 to connect carrier housing 16 to central housing 50 can also be seen.

Figure 4:
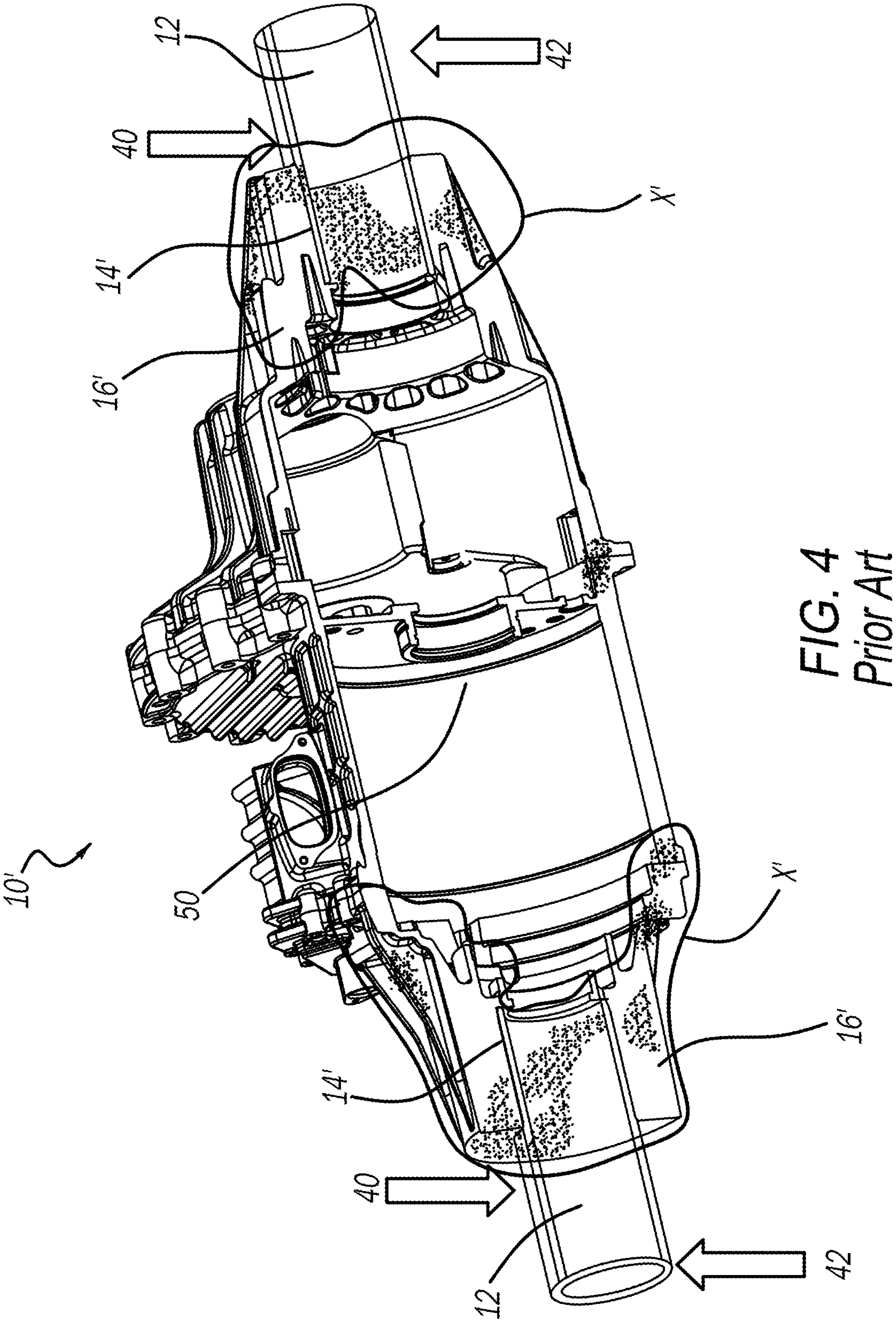
FIG. 4 Prior Art
FIG. 4 is a FEA stress analysis of a carrier housing with a prior single ring structure.
Figure 5:
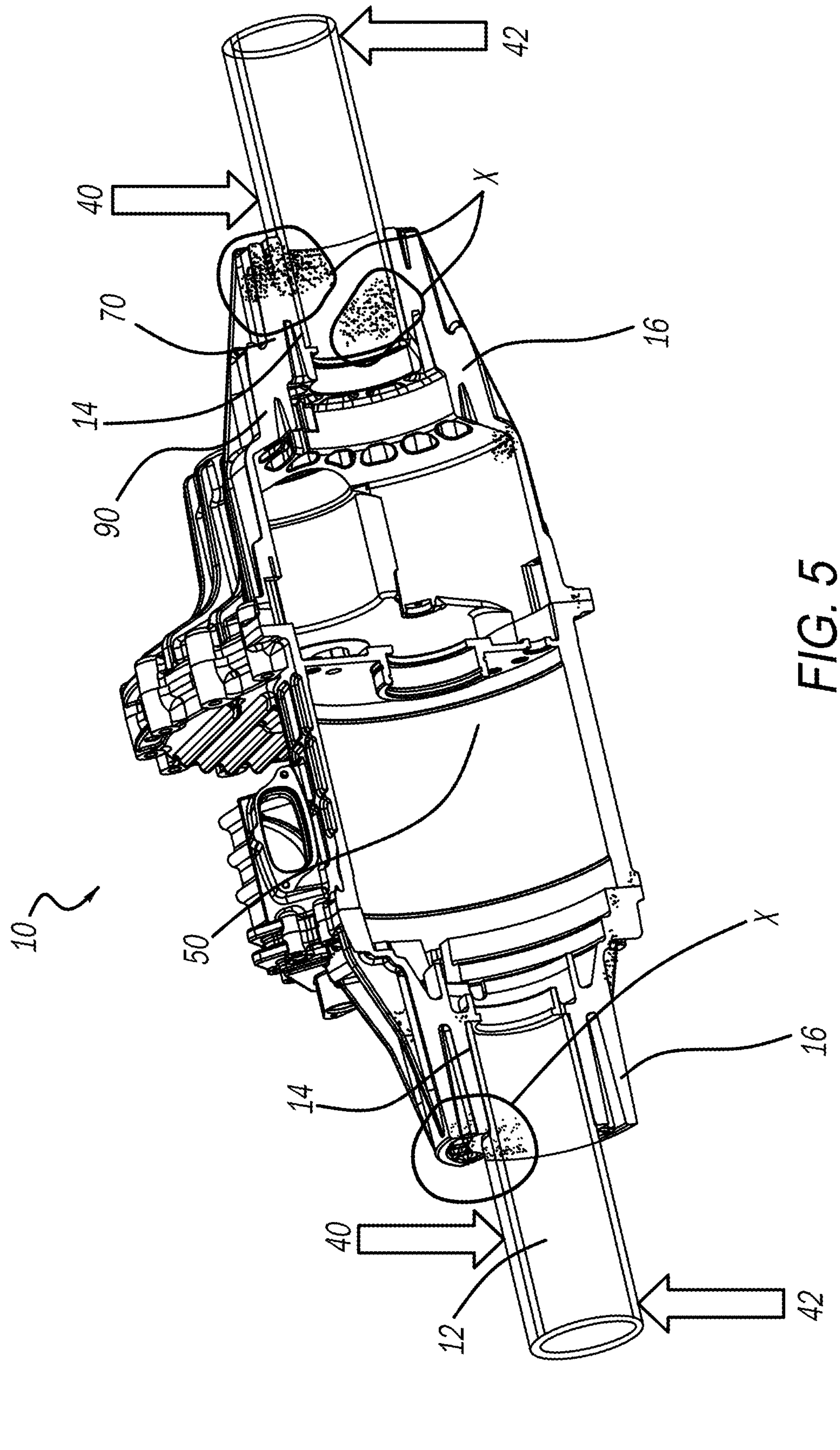
FIG. 5 is a FEA stress analysis of a carrier housing with a dual ring structure of the present disclosure.

Now referring and comparing between FIG. 4 to FIG. 5, these Figures represent finite element stress analysis (FEA) plots of an axle assembly 10 of FIG. 5 having a dual ring structure 70 with an axle assembly 10' of FIG. 4 having a conventional single ring structure in FIG. 4. Both axle assemblies 10, 10' 10 include a central housing 50. Axle assembly 10 has a pair of carrier housings 16 with the dual ring structure 70 mounted to each side. Axle assembly 10' has a pair of carrier housings 16' having the single ring structure, and receiving bore 14', mounted to each side. Analysis used shock loadings representative of 5 times the chassis loading 40. Chassis loading 40 was applied at the location of the spring seat 34 and a resultant wheel loading 42 at wheel hub 24 through bearings 26. A pair of axle tubes 12 inserted into each carrier housing 16 and each carrier housing 16' as previously described were considered in the analysis. These forces result in a bending moment on axle assembly 10 and axle assembly 10', with a theoretical Von Mises stresses, is calculated and high stress areas are plotted as shown in each figure. Such plots of Von Mises stress can be utilized to determine if a material will yield or fracture. Areas of elevated stresses which would be a concern for die cast aluminum materials are shown by areas defined as "X" in FIG. 5 and "X" in FIG. 4, with the darkened areas within "X" and "X" representing the highest stresses. Note the substantial reduction in higher stressed areas in the dual ring structure 70 arrangement of FIG. 5 versus the single ring arrangement of FIG. 4. The high stress area X is reduced in size in the dual ring embodiment of FIG. 5. Additionally, along the receiving bore 14, the overall areas of elevated stress are particularly reduced in size in FIG. 5, such that less deflection is occurring within the joint area, which will ensure that the interference fit is maintained. Although some areas of elevated stress are still seen in FIG. 5 in the area of the receiving bore 14, these areas are localized and at a lower absolute level when compared to FIG. 4. Also, in the area of rib 90, stresses are again significantly reduced, because the dual ring structure 70 in combination with rib 90 ensures receiving bore 14 remains perpendicular to flange 56 with minimal deflection. The design improvements described above therefore allows for the successful integration and function of joining a steel axle tube 14 to a die cast aluminum carrier 16 without the need for additional joining methods (such as welding) or components. It will be appreciated that areas that are not darkened to indicate high stress areas do not all have the same stress level, but rather that these areas are below a level considered to be high stress. An FEA plot includes a gradient of different stress levels and transitions between high stress and low stress. The illustrations of FIGS. 4 and 5 are provided to show the reduced areas of high stress in FIG. 5 relative to the prior single ring structure of FIG. 4, but it will be appreciated that actual stress levels are dependent on actual build and actual loading, and that the stress levels may vary slightly relative to the FEA modeled illustrations. In any event, the FEA analysis performed and illustrated in FIGS. 4 and 5 establishes the benefits of the dual ring structure 70 relative to the prior single ring structure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A support structure for an axle, comprising:
a carrier housing,
a receiving bore defined at an outboard end of the carrier housing adapted to receive an inboard end of a hollow axle tube, and
a dual ring housing structure of the carrier housing, the dual ring housing structure defining the receiving bore and having a radially inner ring and a radially outer ring;
wherein the radially inner ring is adapted to receive the hollow axle tube in an interference fit; and
wherein the dual ring structure provides reduced stresses on the carrier housing relative to a single ring structure;
wherein the radially inner ring and the radially outer ring have tapered thicknesses that increase in the inboard direction.

2. The support structure of claim 1, wherein the radially inner ring and the radially outer ring each define a closed loop extending around a central longitudinal axis.

3. The support structure of claim 1, wherein the outer ring has a reduced radial thickness relative to the inner ring at a given longitudinal location of the dual ring structure.

4. A support structure for an axle, comprising:
a carrier housing,
a receiving bore defined at an outboard end of the carrier housing adapted to receive an inboard end of a hollow axle tube, and
a dual ring housing structure of the carrier housing, the dual ring housing structure defining the receiving bore and having a radially inner ring and a radially outer ring;
wherein the radially inner ring is adapted to receive the hollow axle tube in an interference fit; and
wherein the dual ring structure provides reduced stresses on the carrier housing relative to a single ring structure;
wherein the carrier housing includes a plurality of circumferentially spaced inner ribs extending radially between the radially inner ring and the radially outer ring.

5. The support structure of claim 4, wherein the carrier housing includes an inboard radial flange adapted for connection to an outboard face of a central housing.

6. The support structure of claim 5, wherein the carrier housing includes a plurality of circumferentially spaced outer ribs extending between the radially outer ring and the inboard radial flange.

7. The support structure of claim 6, wherein the inner ribs and the outer ribs are radially aligned.

8. The support structure of claim 4, wherein the inner ribs define a plurality of open spaces between the inner ring and the outer ring.

9. A support structure for an axle, comprising:
a carrier housing,
a receiving bore defined at an outboard end of the carrier housing adapted to receive an inboard end of a hollow axle tube, and
a dual ring housing structure of the carrier housing, the dual ring housing structure defining the receiving bore and having a radially inner ring and a radially outer ring;
wherein the radially inner ring is adapted to receive the hollow axle tube in an interference fit; and
wherein the dual ring structure provides reduced stresses on the carrier housing relative to a single ring structure;
wherein the inner ring and the outer ring merge together at a location inboard of a base of the receiving bore.

10. An axle assembly for a vehicle, comprising:
a carrier housing defining a receiving bore at an outboard end thereof;
a hollow axle tube having an inboard end received in the receiving bore; and
a dual ring housing structure of the carrier housing, the dual ring housing structure defining the receiving bore and having a radially inner ring and a radially outer ring;
wherein the hollow axle tube is received and secured within the radially inner ring in an interference fit; and
wherein the dual ring structure provides reduced stresses on the carrier housing relative to a single ring structure; and
a plurality of inner ribs extending radially between the inner ring and the outer ring and defining a plurality of open spaces between the inner and outer rings.

11. The axle assembly of claim 10, wherein the axle tube has a greater diameter than the inner diameter of the radially inner ring.

12. The axle assembly of claim 10, wherein the inner ring has a greater thickness than the outer ring.

13. The axle assembly of claim 10, further comprising a plurality of outer ribs extending radially outward from the outer ring and between the outer ring and a radial flange disposed at an inboard end of the carrier housing.

14. The axle assembly of claim 13, wherein the inner and outer ribs are planarly aligned.

15. The axle assembly of claim 10, further comprising a spring mount connected to the hollow axle tube, the spring mount receiving a downward chassis load.

16. The axle assembly of claim 15, further comprising an axle shaft extending through the hollow axle tube and rotatable relative thereto, and a wheel hub fixed to the axle shaft at an outboard end thereof, wherein the wheel hub extends around and is supported on the hollow axle tube via bearings disposed radially therebetween, wherein the wheel hub rotates with the axle shaft relative to the hollow axle tube and the carrier housing.

17. The axle assembly of claim 16, wherein a wheel attached to the wheel hub provides an upward reaction force at the outboard end of the axle tube in response to the downward chassis load, thereby causing a bending load at the interference fit, wherein the dual ring structure provides a reduced stress concentration at the interference fit relative to the single ring structure.

18. The axle assembly of claim 10, wherein the carrier housing and the axle tube are made of dissimilar metals and are securely fixed via the interference fit and without the use of welding.

* * * * *